MODULATOR

Filed Feb. 14, 1952 2 Sheets-Sheet 1

INVENTOR
WILLIAM E. BRADLEY
BY
Brown, Denk & Synnestvedt
AGENTS

June 11, 1957 W. E. BRADLEY 2,795,761

MODULATOR

Filed Feb. 14, 1952 2 Sheets-Sheet 2

INVENTOR.
WILLIAM E. BRADLEY
BY
Brown, Denk & Synnestvedt
AGENTS

United States Patent Office 2,795,761
Patented June 11, 1957

2,795,761

MODULATOR

William E. Bradley, New Hope, Pa., assignor to Philco Corporation, Philadelphia, Pa., a corporation of Pennsylvania Application February 14, 1952, Serial No. 271,477
9 Claims. (Cl. 332—7)

The invention herein described and claimed relates to signal modulation systems and especially to such systems which are particularly adapted to produce a modulated signal in the super-high or microwave range in response to a correspondingly modulated signal at a lower frequency.

Heterodyne modulator circuits in which a relatively low frequency carrier-wave signal, modulated in amplitude, frequency or phase, may be mixed with a much higher frequency, unmodulated carrier-wave signal supplied from any suitable carrier-wave signal generator to produce a signal having the modulation of the low frequency signal and a frequency which is equal to the high frequency plus or minus an integral multiple of the low frequency are particularly useful in transmitting and relay stations for the transmission of wide band (e. g. television) signals. Examples of this type of circuit may be found in my Patents Nos. 2,495,801 and 2,566,820 dated January 10, 1950, and September 4, 1951, respectively. This method of modulation possesses numerous advantages over other methods available for use in producing modulated super-high frequency carrier wave signals. For example, where heterodyne modulation is employed, it is unnecessary at each relay station in a chain to demodulate the received, modulated carrier-wave signal prior to retransmission. Instead, it is only necessary to convert the received signal to a suitable modulated intermediate frequency, to amplify this modulated intermediate frequency signal, and then to mix it with a super-high frequency signal to yield a new modulated carrier-wave signal at a frequency equal to or different from the received signal. However, such heterodyne modulator circuits have the disadvantage over feedback repeaters, for example, that, in the past, two velocity modulated electron tubes were considered necessary for each heterodyne modulator. One velocity modulated electron tube is required to generate the super-high frequency or microwave carrier signal and the second velocity modulated electron tube is required to mix this high frequency signal with the lower frequency, modulated, carrier-wave signal. Similar disadvantages are also present in heterodyne modulator circuits operating at frequencies below the super-high or microwave frequency bands.

Accordingly it is an object of this invention to provide a circuit operating on the heterodyne modulator principle but employing fewer components than previous circuits of this type.

A further object of this invention is to provide a circuit operating on the heterodyne modulation principle which employs a single velocity modulated electron tube.

A further object of this invention is to provide improved methods of and means for producing modulated carrier wave signals particularly where the carrier frequency is to be situated in the super-high or microwave frequency range.

These and other objects of my invention, which will become apparent as the description of the invention proceeds are achieved in a system in which a flow of charged particles from an emitter is modulated in amplitude or velocity by a low frequency signal impressed with the desired modulation and again modulated in amplitude or velocity at a high frequency to produce sidebands of said high frequency and integral multiples of said low frequency. An output coupling network is provided for extracting energy at said high frequency and at one of said sideband frequencies from said modulated flow of charged particles. Energy at said high frequency is coupled through a frequency selective means to the means for accomplishing the modulation at the high frequency.

For a better understanding of the invention, together with other and further objects, features and advantages thereof, reference should be made to the accompanying drawings in which.

Figure 1:
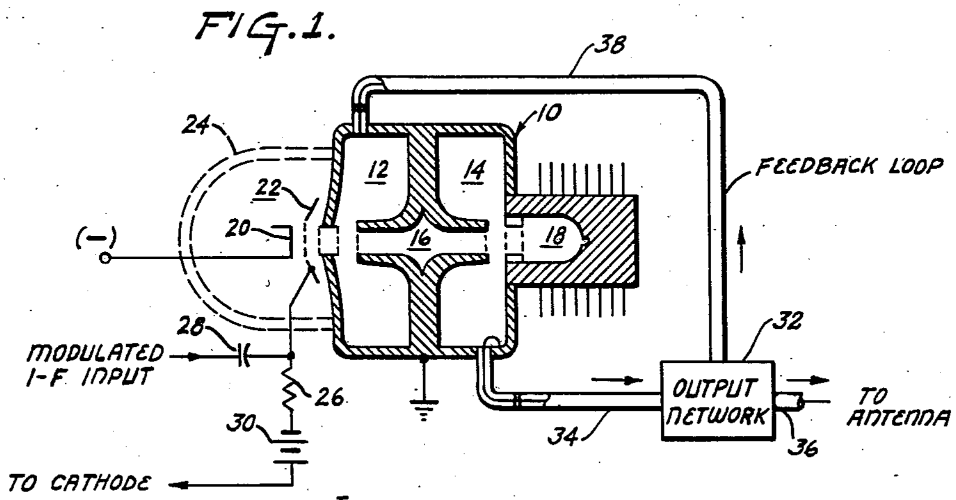
Fig. 1 is a schematic diagram showing the general arrangement of the present invention.

Referring now to Fig. 1, the velocity-modulated tube illustrated is of the type known to the art as a two-cavity klystron and has a control grid capable of amplitude modulating the flow of electrons therein. The tube comprises generally an anode structure 10 enclosing an input or buncher cavity resonator 12 and an output or catcher cavity resonator 14 separated by a field free drift space 16. An end cap 18 is provided for collecting the electrons passing through catcher cavity resonator 14. A cathode 20, which may be heated in the usual manner, provides a source of electrons. A control grid 22, disposed adjacent cathode 20, is provided for amplitude modulating the flow of electrons from cathode 20 toward the anode structure 10. A glass envelope 24, enclosing cathode 20 and grid 22, is sealed to the anode structure 10 and suitable vacuum seals are provided in the transmission lines communicating with cavity resonators 12 and 14 so that the discharge space may be evacuated in the usual manner.

In order to accelerate the electrons emitted from cathode 20 toward drift space 16 a suitable potential is applied between cathode 20 and anode structure 10. This is accomplished by maintaining anode structure 10 at ground potential and returning cathode 20 to the negative terminal of a high voltage power supply which has the positive terminal at ground potential. Such a power supply is schematically illustrated in Fig. 1 by the ground symbol at anode structure 10 and the minus sign adjacent cathode 20. For reasons that will appear presently, grid 22 is biased negatively with respect to cathode 20 so that electrons are permitted to pass from cathode 20 to anode structure 10 during appreciably less than one-half of each cycle of a signal applied to grid 22 through the resistor-capacitor coupling network composed of resistor 26 and capacitor 28. The means for biasing grid 22 negatively is illustrated in Fig. 1 as bias battery 30 although it should be understood that generally no separate bias source will be provided since the biasing potential is more economically obtained from a suitable tap on the power supply associated with cathode 20.

Buncher cavity resonator 12 is tuned to a frequency corresponding to the super-high or microwave carrier frequency of a heterodyne modulation system. Catcher cavity resonator 14 is preferably although not necessarily tuned to a frequency equal to the sum or difference of the abovementioned carrier frequency plus or minus an integral multiple of the intermediate frequency applied to grid 20. For purposes of simplifying the description of the invention, the super-high or microwave carrier frequency will hereinafter be referred to simply as the high frequency and the signal applied to grid 22 will be referred to as the low frequency. The term sum or difference frequency as hereinafter used in the specification and claims is intended to designate a single frequency for any particular condition of operation of the system. However, this frequency may be selected from the group of frequencies which are equal to the high frequency plus or minus integral multiples of the low frequency.

Figure 3:
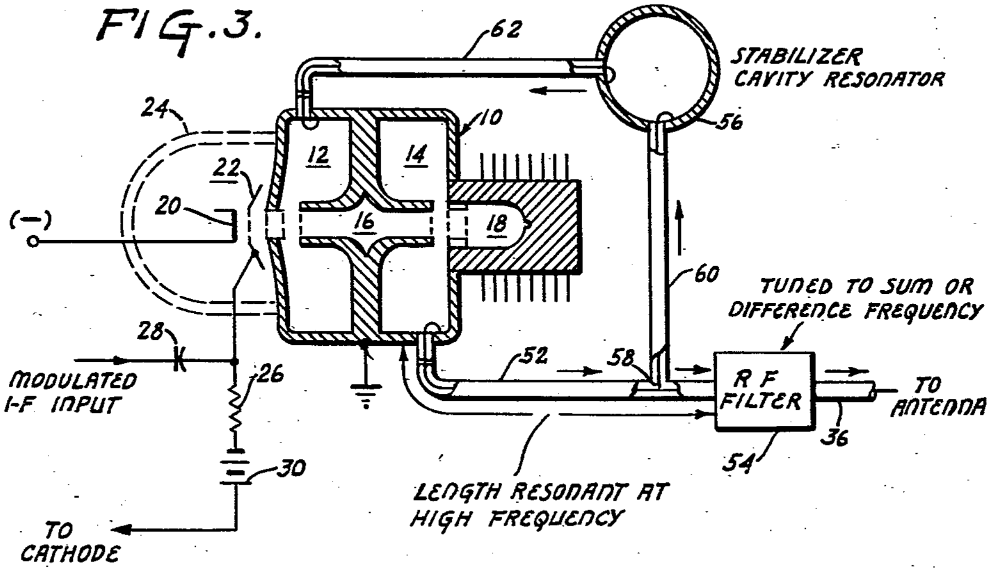
Fig. 3 is a second schematic diagram showing a preferred form of the present invention.

An output network 32 is coupled to catcher cavity resonator 14 by a transmission line section 34 which may be of the coaxial line or hollow waveguide type. Cavity resonator 14 may be tuned to and thereby caused to present a high impedance at the sum and difference frequency. Output network 32 is so constructed that it reflects a high impedance into cavity resonator 14 at the high frequency. If this construction is employed a signal of useful amplitude is produced in cavity resonator 14 at both said high frequency and said sum or difference frequency. It may be desirable in certain embodiments of the invention to cause output network 32 to reflect a high impedance at both the high frequency and the sum or difference frequency. Output network 32 may consist of tuned cavity resonators or transmission line sections coupled to transmission line 34 in accordance with the well known principles of microwave filter circuits. What is now considered to be a preferred embodiment of output network 32 is illustrated in Fig. 3 and will be described more fully hereinafter.

A transmission line section 36 is provided for coupling energy at the sum or difference frequency to some form of utilizing system, for example a transmitting antenna for radiating the signal to a receiving station. An additional transmission line section 38 is provided for coupling energy at the high frequency from output network 32 to buncher cavity resonator 12 to energize the buncher cavity resonator.

It is possible and within the scope of the present invention to provide a second coupling to cavity resonator 14 for extracting a signal at the high frequency to be fed back to buncher cavity resonator 12. If this second coupling is employed, output network 32 may be a simple band pass filter tuned to the sum or difference frequency and a cavity resonator tuned to the high frequency may be placed in the transmission line forming the feedback loop between cavity resonators 14 and 12. This cavity resonator in the feedback loop will reflect the high impedance into cavity resonator 14 at the high frequency. However, it is usually undesirable to employ more than one coupling to cavity resonator 14 and for this reason the arrangement illustrated in Fig. 1 is preferable to the one just described.

The operating potentials and frequencies in the circuit of Fig. 1 will depend upon the design of the velocity modulated tube and the desired output frequency. The following potentials and frequencies illustrate one possible condition of operation but the invention is not to be limited to the potentials or frequencies mentioned nor to potentials or frequencies in the immediate range of those given below.

| | |
|---|---|
| Anode potential | Ground. |
| Cathode potential | —1000 v. |
| Grid to cathode bias | —50 v. |
| Cutoff voltage for grid | —25 v. |
| I.-F. input signal (100 mc., amplitude, phase or frequency modulated) | 100 v., peak-to-peak. |
| Resonant frequency of cavity 12 | 6000 mc. |
| Sum or different frequency | 6100 mc. |

As is more fully pointed out in my Patent No. 2,566,820 issued September 4, 1951, for Signal Mixing System, if the buncher cavity resonator of a velocity modulated tube, here cavity resonator 12, is excited at a high frequency and the control grid, here control grid 22, is to biased that electrons are allowed to flow from the cathode toward the drift space for appreciably less than one-half of each cycle of the low frequency, the current at the catcher cavity resonator will contain components at the low order sideband frequencies that are comparable in amplitude to the fundamental or high frequency component.

Specifically the total current $i_{(t)}$ may be expressed as $$i_{(t)}=Re\sum_{-\infty}^{+\infty}I_n\epsilon j(\omega_0+n\omega_s)t \qquad (1)$$

where

Re denotes "the real part of"

$I_n$ is the magnitude of the fundamental or sideband component of order $n$.

$n$ is the order of the sideband component and may have the value zero (fundamental) or a positive or negative integer.

$\omega_0$ is the high frequency $\omega_s$ is the low frequency

From this it can be shown that $$I_n=\frac{\sin\,(n\pi a)}{n\pi} \qquad (2)$$

where $a$ is the fraction of each cycle of the low frequency during which electrons flow from the cathode to the anode, and $I_n$ and $n$ represents the same quantities as in Equation 1.

Figure 2:
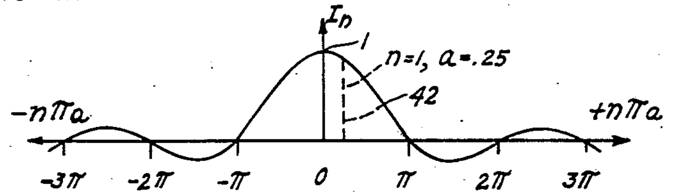
Fig. 2 is a curve illustrating the theoretical relationship between certain factors relating to the operation of the circuits of Figs. 1 and 3.

In Fig. 2 the magnitudes of the current components $I_n$ are plotted as ordinates against the values of $n\pi a$ as abscissae. It will be noted that the magnitude of the fundamental component ($n=0$, therefore $n\pi a=0$) is unity. The amplitude of the first order sideband, $n=\pi$ for conduction during one-quarter of each cycle of the low frequency, $a=.25$, is illustrated by the vertical dashed line 42. Line 42 corresponds to the sum or difference frequency of 6100 mc. given in the abovementioned example. If the catcher cavity resonator 14 is caused to present a suitable high impedance at the fundamental (high) frequency and the first order sideband (sum or difference) frequency a usable signal may be derived from cavity resonator 14 at each of these frequencies. The high impedance at each of these frequencies is provided by tuning cavity resonator 14 to the sum or difference frequency and by the reflection of impedance from output network 32 in the manner described above.

The signal at the high frequency is fed back to buncher cavity resonator 12 to supply the energy required to alter the velocities of the electrons passing through this cavity resonator. In the general illustration of the invention shown in Fig. 1 the signal at the high frequency is fed directly to cavity resonator 12, it being assumed that cavity resonator 12 is of sufficiently high Q and has sufficient frequency stability to maintain the high frequency within acceptable frequency limits. A method and means for maintaining greater frequency stability than is generally possible with commercially available tubes is illustrated in Fig. 3.

From the foregoing description it will be apparent that the system of Fig. 1 is self-energizing at the high frequency. Since the system is self-energizing at the high frequency, the second velocity modulated tube usually required in conventional heterodyne modulation systems to supply this high frequency is no longer required. There is a limit, of course, to the total amount of energy that may be extracted at the two frequencies from cavity resonator 14 but this energy may be divided in any desired ratio between the signals at the two frequencies by appropriate design of the couplings from transmission lines 36 and 38 to output network 38. It will usually be desirable to extract only enough energy at the high frequency to cause the system to be self-energizing so that a maximum amount of energy may be supplied at the sum or difference frequency to the utilizing device.

Fig. 3 illustrates a preferred embodiment of the present invention operating on the same general principles as the system of Fig. 1 but with certain modifications in construction to improve the operation thereof. Parts in Fig. 3 corresponding to identical parts in Fig. 1 have been given the same reference numerals.

In the system of Fig. 3 a signal is coupled from cavity resonator 14 through a transmission line section 52 having a length resonant at the high frequency to radio-frequency filter 54, radio-frequency filter 54 is tuned to the sum or difference frequency and is matched in impedance to transmission line 52 at this frequency. Cavity resonator 14 is tuned to the sum or difference frequency, that is the same frequency as filter 54, so that cavity resonator 14 presents the necessary high impedance to cause a signal of usable amplitude at the sum or difference frequency to be produced at the output of filter 54. Since the high frequency is displaced from the resonant frequency of filter 54, this filter will present a mismatched termination to transmission line 52 at the high frequency. This mismatched termination will result in standing waves being set up in transmission line section 52 which will be of considerable amplitude due to the resonant length of this transmission line section. The mismatched termination presented by filter 54 will also be reflected into resonator 14, thereby causing resonator 14 to present a high impedance at the high frequency.

A stabilizer cavity resonator 56, sharply tuned to the high frequency, is coupled to transmission line section 52 by means of a probe 58 and transmission line section 60. The position or depth of insertion of probe 58 or both may be adjusted to control the amount of energy coupled from transmission line section 52 to stabilizer cavity resonator 56.

Stabilizer cavity resonator 56 is preferably temperature compensated and very stable so that the high frequency, and hence the difference between the low frequency and the sum or difference frequency coupled to the utilizing device, will remain at a fixed, preselected value. Cavity resonator 56 is coupled to buncher cavity resonator 12 by transmission line section 62 to complete the energy feedback loop.

The signal applied to the control grid of the system of Fig. 3 may be unmodulated or modulated in amplitude, phase or frequency. The signal at the output of filter 54 will be at a higher frequency but similarly unmodulated or modulated in amplitude, phase or frequency.

Figure 4:
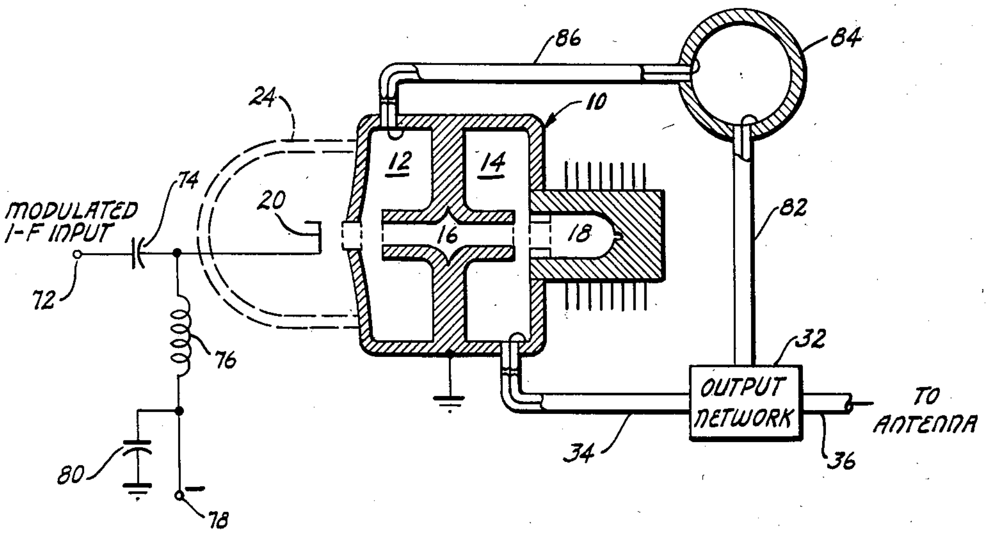
Fig. 4 is a schematic diagram showing a second preferred embodiment of the present invention in which the low frequency signal is applied to the cathode of the velocity-modulated tube.

The embodiment of the invention shown in Fig. 4 is similar to the embodiments of Figs. 1 and 3 but with the difference that the low frequency signal is applied to the cathode 20 rather than to a control grid. Therefore, parts in Fig. 4 corresponding to like parts in Figs. 1 and 3 have been given the same reference numerals. In this embodiment of the invention, no control grid capable of amplitude modulating the flow of electrons from the cathode to the buncher cavity is required. The intermediate frequency signal, modulated in phase, amplitude or frequency as before, is applied at terminal 72. Terminal 72 is connected to cathode 20 through a coupling network consisting of capacitor 74 and inductor 76. Biasing potential for cathode 20 is applied at terminal 78 which is by-passed to ground for the signal at terminal 72 by capacitor 80. The output signal is coupled from cavity resonator 14 by means of a transmission line 34 as described above. Output network 32 which may be the network illustrated in detail in Fig. 3 or any other network falling within the description of output network 32 of Fig. 1 is coupled to transmission line 34. From output network 32 a transmission line 36 couples energy to the antenna and a second transmission 82 couples energy to the frequency stabilizing cavity 84. Energy is coupled from stabilizing cavity resonator 84 to buncher cavity resonator 12 by means of transmission line 86. In any of the embodiments of the invention, the frequency stabilizing cavity may be replaced by any element or system sharply frequency selective at the high frequency. For example, resonator 84 may be replaced by a bridge circuit which is normally balanced so that no energy is coupled from output network 32 to cavity resonator 12 but which becomes unbalanced at its high frequency. Typical operating potentials for the embodiment shown in Fig. 4 might be as follows:

| | |
|---|---|
| Anode potential | Ground. |
| Cathode potential | —500 v. |
| I. F. input signal (100 mc., amplitude, phase or frequency modulated) | 160 v., peak-to-peak. |
| Resonant frequency of cavity 12 | 6000 mc. |
| Sum or difference frequency | 6100 mc. |
| Resonant frequency of cavity 84 | 6000 mc. |

The low frequency signal applied to cathode 20 modulates the velocity of the electron beam in buncher cavity 12. With the values of potentials given above, this signal would modulate the velocity of the electron beams by plus or minus 16%. This modulation of the velocity varies the transit time of the electron beam through drift space 16 at the low frequency and consequently phase modulates the high frequency signal which is applied to buncher cavity resonator 12. The phase modulation at the low frequency produces sidebands in catcher cavity resonator 14 spaced from the high frequency by intervals equal to integral multiples of the low frequency. Each of the sidebands contains modulation intelligence present in the modulated signal applied at terminal 72. The system of Fig. 4 may also be employed to provide an unmodulated sum or difference frequency which is equal to the sum of a high frequency in an integral multiple of a low frequency by applying an unmodulated low frequency signal at input 72. Signals at the sum or difference frequency and at the high frequency are coupled from cavity 14 as before. The high frequency signal is coupled through transmission line 82, stabilizing cavity 84 and transmission line 86 to buncher cavity resonator 12. The signal at the sum or difference frequency passes through output network 32 to transmission line 36 and from there to the utilizing device, for example a transmitting antenna.

For the sake of clarity in the drawings the transmission line sections of Figs. 1, 3 and 4 are shown as being of the coaxial line type. However, the invention is not to be so limited since waveguides or other types of transmission lines may be preferred in certain embodiments of the invention. Furthermore, the invention is not to be limited to the types of velocity modulated tubes shown but is to be construed to embrace all similar systems in which energy is added to or extracted from a modulated beam of charged particles by any electrical, magnetic or mechanical means now known in the art.

Figure 5:
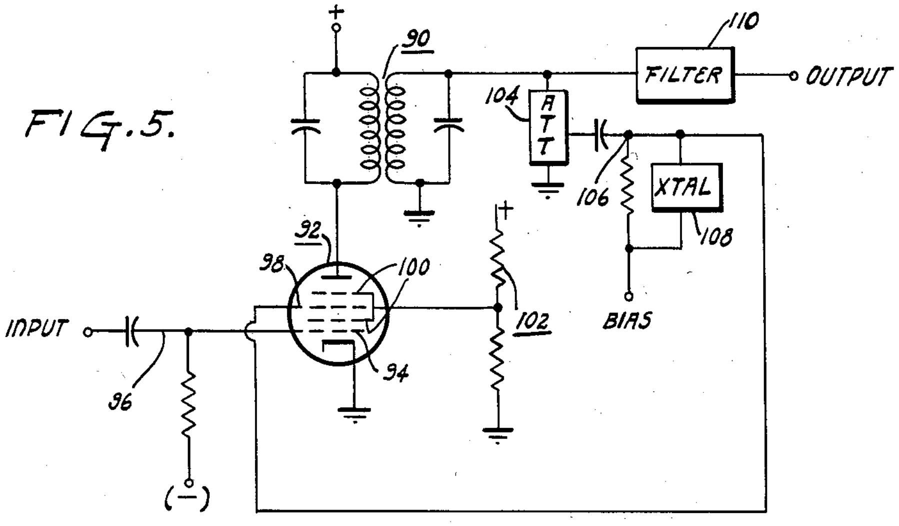
Fig. 5 is a schematic diagram of a low frequency embodiment of the present invention.

The scope of the invention also includes circuits operating at frequencies below the super-high and microwave regions and circuits in which the flow of charged particles is amplitude modulated at the high frequency rather than velocity modulated as described above. Fig. 5 shows such a low frequency embodiment of the present invention. The double tuned circuit 90 which connects the anode of vacuum tube 92 to the anode bias supply represented by the plus sign (+) is tuned to resonate at the high frequency and at the sum and difference frequency. Double tuned circuit 90 is equivalent in function to the catcher cavity resonator 14 and output network 32 of Figs. 1 and 4. The first grid 94 of vacuum tube 92 is provided with a negative bias represented by the minus sign (—) to permit anode current flow during only a small fraction of the low frequency, modulated signal applied to this grid by way of coupling network 96. The signal is amplitude modulated at the high frequency by a signal applied to a second grid 98 of vacuum tube 92. This second grid 98 may be shielded from the first grid 94 and the anode by additional grids 100 maintained at a fixed potential as, for example, by voltage divider network 102. The signal applied to the second grid 98 is obtained from the secondary of the double tuned circuit 90 and is coupled to the second grid 98 through a suitable resistance or capacitance series attenuator 104 and a conventional resistance-capacitance coupling network 106. The coupling network 106 may be returned to the cathode or to a source of fixed bias voltage. A crystal 108, resonant at the high frequency, is coupled in shunt with the coupling network 106 of the second grid 98 in order that only the signal at high frequency is coupled to said second grid. The output signal at the sum or difference frequency is obtained from the secondary of the double tuned circuit 90 through a filter 110 that is designed to exclude signals at the high frequency.

Having illustrated and described what are present considered to be preferred embodiments of the present invention and having set forth the manner in which the same may be constructed and operated.

I claim:

1. A system responsive to a relatively low frequency signal for producing an output signal of a frequency substantially equal to the sum or difference of a relatively high frequency and an integral multiple of said low frequency, said system comprising, a velocity modulated type vacuum tube including at least an emitter of electrically charged particles, a control grid, an input cavity resonator resonant at substantially said high frequency, a drift space for said particles and an output cavity resonator resonant substantially at the said sum or difference frequency, means constituting a frequency selective energy feedback path coupled between said output cavity resonator and said input cavity resonator, said energy feedback path passing only energy substantially at said high frequency, said energy in said feedback path being coupled to said input cavity resonator in a manner to provide bunching of said particles at said high frequency in the vicinity of said output cavity resonator, means for applying said low frequency signal to said control grid, means for biasing said control grid to permit the flow of charged particles in said tube during appreciably less than one-half of each cycle of said low frequency signal and means for coupling from said output cavity resonator a signal at said sum or difference frequency.

2. In a signal mixing system for mixing a relatively low frequency signal and a relatively high frequency signal to yield a signal whose frequency is substantially the sum or difference of said high frequency and an integral multiple of said low frequency, a velocity modulated type vacuum tube including at least an emitter of electrically charged particles, a control grid, an input cavity resonator resonant at substantially said high frequency, a drift space for said particles and an output cavity resonator resonant at substantially the frequency of the signal to be produced, a frequency controlling cavity resonator resonant at substantially said high frequency, means coupling said frequency controlling cavity resonator to said output cavity resonator, means coupling said input cavity resonator to said frequency controlling cavity resonator thereby providing a feedback path for energy at said high frequency from said output cavity resonator to said input cavity resonator, said energy in said feedback path being coupled to said input cavity resonator in a manner to provide bunching of said charged particles at said high frequency in the vicinity of said output cavity resonator, means for applying said low frequency signal to said control grid, means for biasing said control grid to permit the flow of charged particles in said tube during appreciably less than one-half of each cycle of said low frequency signal and means for deriving a signal at said sum or difference frequency from said output cavity resonator.

3. A system responsive to a relatively low frequency signal for producing an output signal, the frequency of which is substantially equal to a relatively high frequency plus or minus an integral multiple of said low frequency, said system comprising a velocity modulated type vacuum tube including at least an emitter of electrically charged particles, a grid capable of amplitude modulating the flow of said charged particles, an input cavity resonator resonant at substantially said high frequency, a drift space for said particles and an output cavity resonator resonant at substantially the desired sum or difference frequency of said high frequency and an integral multiple of said low frequency, means for applying said low frequency signal to said grid, means for biasing said grid to permit the flow of said charged particles in said tube during appreciably less than one-half of each cycle of said low frequency signal, means coupled to said output cavity resonator for causing said output cavity resonator to present a high impedance at said high frequency thereby to cause signals at said high frequency and said sum or difference frequency to be produced in said output cavity resonator, means electrically coupled to said output cavity resonator and said input cavity resonator for coupling energy at said high frequency from said output cavity resonator to said input cavity resonator, and means coupled to said output cavity resonator for extracting a signal at said sum or difference frequency.

4. A system responsive to a relatively low frequency signal for producing an output signal, the frequency of which is substantially equal to the sum or difference of a relatively high frequency and an integral multiple of said low frequency, said system comprising a velocity modulated type vacuum tube including at least an emitter of electrically charged particles, an input cavity resonator resonant at substantially said high frequency, a drift space for said particles and an output cavity resonator, the half bandwidth of said output cavity resonator being substantially less than said low frequency, means for stopping the flow of particles in said drift space during intervals of predetermined duration, said intervals recurring at said low frequency, means coupled to said output cavity resonator for causing said output cavity resonator to exhibit a double-peaked impedance vs. frequency response, one peak occurring at said high frequency and the other peak occurring at said sum or difference frequency thereby to cause signals of comparable amplitude at said high frequency and said sum or difference frequency to be produced in said output cavity resonator, means electrically coupled to said output cavity resonator and said input cavity resonator for coupling energy at said high frequency from said output cavity resonator to said input cavity resonator, said energy being coupled to said input cavity resonator in a manner to alter the velocities of said particles at said high frequency, and means coupled to said output cavity resonator for extracting a signal at said sum or difference frequency.

5. A system responsive to a relatively low frequency signal for producing an output signal, the frequency of which is equal to the sum or difference of a relatively high frequency and an integral multiple of said relatively low frequency, said system comprising a velocity modulated type vacuum tube including at least an emitter of electrically charged particles, a buncher cavity resonator resonant at said relatively high frequency, a catcher cavity resonator, the half bandwidth of said catcher cavity resonator being substantially less than said integral multiple of said relatively low frequency, a drift space for said electrically charged particles separating said cavity resonators and a grid capable of interrupting the flow of said particles in said drift space, means for applying said low frequency signal to said grid, means for biasing said grid to permit the flow of said charged particles in said tube during approximately one-quarter of each cycle of said low frequency signal, means coupled to said catcher cavity resonator for causing said catcher cavity resonator to exhibit a double-peaked impedance vs. frequency response, one peak occurring at said high frequency and the other peak occurring at said sum or difference frequency thereby to cause signals of comparable amplitude at said high frequency and at said sum or difference frequency to be produced in said catcher cavity resonator, means including a frequency stabilizing cavity resonator sharply tuned to said high frequency electrically coupled to said catcher cavity resonator and to said buncher cavity resonator for coupling energy at said high frequency from said catcher cavity resonator to said buncher cavity resonator and means coupled to said output cavity resonator for extracting a signal at said sum or difference frequency.

6. A signal tube heterodyne modulation system responsive to a relatively low frequency modulated signal for producing an output signal with equivalent modulation at a frequency which is the sum or difference of a relatively high frequency and an integral multiple of said low frequency, said system comprising a velocity modulated type vacuum tube including at least an emitter of electrically charged particles, a buncher cavity resonator, a catcher cavity resonator, the half bandwidth of said catcher cavity resonator being substantially less than said integral multiple of said low frequency, a field free drift space for said electrically charged particles separating said resonators and a grid capable of interrupting the flow of said particles in said drift space, a source of potential coupled between said emitter and said buncher cavity resonator for accelerating said electrically charged particles toward said drift space, means for applying said low frequency signals to said grid, means for biasing said grid to permit the flow of said charged particles toward said drift space during approximately one-quarter of each cycle of said low frequency signal, an output filter network coupled to said catcher cavity resonator, said output filter network reflecting a high impedance into said catcher cavity resonator at said high frequency and at said sum or difference frequency thereby to cause said catcher cavity resonator to exhibit a double-peaked impedance vs. frequency response whereby signals at said high frequency and at said sum or difference frequency are produced at the output of said output filter network, an energy feedback circuit including a frequency stabilizing cavity resonator sharply tuned to said high frequency electrically coupled to said output filter network and to said buncher cavity, said energy feedback circuit being adjusted to supply sufficient energy to said buncher cavity resonator to cause said system to generate a continuous signal at said high frequency, and means coupled to said output filter network for utilizing said signal at said sum or difference frequency.

7. A single tube heterodyne modulation system responsive to a relatively low frequency, modulated signal for producing an output signal with equivalent modulation at a frequency which is the sum or difference of a relatively high frequency and an integral multiple of said low frequency, said system comprising a velocity modulated type vacuum tube including at least an emitter of electrically charged particles, a buncher cavity resonator resonant at said high frequency, a catcher cavity resonator, the half bandwidth of said catcher cavity resonator being substantially less than said integral multiple of said low frequency, and a field free drift space for said electrically charged particles separating said resonators, a source of potential coupled between said emitter and said buncher cavity resonator for accelerating said electrically charged particles toward said drift space, means for applying said low frequency signals to said emitter to modulate the velocities of said charged particles in the direction of said drift space, an output filter network coupled to said catcher cavity resonator, said output filter network reflecting a high impedance into said catcher cavity resonator at said high frequency and at said sum or difference frequency thereby to cause said catcher cavity resonator to exhibit a double-peaked impedance vs. frequency response whereby signals at said high frequency and at said sum or difference frequency are produced at the output of said output filter network, a frequency selective energy feedback network coupling said output filter network to said buncher cavity resonator for said high frequency signal, said energy feedback network being adjusted to supply energy at said high frequency to said buncher cavity resonator to cause said system to generate a continuous signal at said high frequency, and means coupled to said output filter network for utilizing said signal at said sum or difference frequency.

8. A system responsive to a relatively low frequency signal for producing an output signal, the frequency of which is substantially equal to the sum or difference of a relatively high frequency and an integral multiple of said low frequency, said system comprising a velocity modulated type vacuum tube including at least an emitter of electrically charged particles, an input cavity resonator resonant at substantially said high frequency, a drift space for said particles and an output cavity resonator, the half bandwidth of said output cavity resonator being substantially less than said low frequency, means for modulating the flow of particles in said drift space at said low frequency, means coupled to said output cavity resonator for causing said output cavity resonator to exhibit a double-peaked impedance vs. frequency response, one peak occurring at said high frequency and the other peak occurring at said sum or difference frequency thereby to cause signals of comparable amplitude at said high frequency and said sum or difference frequency to be produced in said output cavity resonator, means electrically coupled to said output cavity resonator and said input cavity resonator for coupling energy at said high frequency from said output cavity resonator to said input cavity resonator, said energy being coupled to said input cavity resonator in a manner to alter the velocities of said particles at said high frequency, and means coupled to said output cavity resonator for extracting a signal at said sum or difference frequency.

9. A single tube heterodyne modulation system responsive to a relatively low frequency, modulated signal for producing an output signal with equivalent modulation at a frequency which is the sum or difference of a relatively high frequency and an integral multiple of said low frequency, said system comprising a velocity modulated type vacuum tube including at least an emitter of electrically charged particles, a buncher cavity resonator resonant at said high frequency, a catcher cavity resonator, the half bandwidth of said catcher cavity resonator being substantially less than said integral multiple of said low frequency, and a field free drift space for said electrically charged particles separating said resonators, a source of potential coupled between said emitter and said buncher cavity resonator for accelerating said electrically charged particles toward said drift space, means for applying said low frequency signals to said emitter to modulate the velocities of said charged particles in the direction of said drift space, an output filter network coupled to said catcher cavity resonator, said catcher cavity resonator being resonant at one of two frequencies, said two frequencies being said high frequency and said sum or difference frequency, an output filter network coupled to said catcher cavity resonator, said output filter network reflecting a high impedance into said catcher cavity resonator at the other of said two last-mentioned frequencies, thereby to cause said catcher cavity resonator to exhibit a double-peaked impedance vs. frequency response whereby signals at said high frequency and at said sum or difference frequency are produced at the output of said output filter network, a frequency selective energy feedback network coupling said output filter network to said buncher cavity resonator for said high frequency signal, said energy feedback network being adjusted to supply energy at said high frequency to said buncher cavity resonator to cause said system to generate a continuous signal at said high frequency, and means coupled to said output filter network for utilizing said signal at said sum or difference frequency.

References Cited in the file of this patent

UNITED STATES PATENTS

| | | |
|---|---|---|
| Re. 23,271 | Hansen et al. | Sept. 26, 1950 |
| 2,067,536 | Klotz | Jan. 12, 1937 |
| 2,445,811 | Varian | July 27, 1948 |
| 2,482,766 | Hansen et al. | Sept. 27, 1949 |
| 2,493,801 | Bradley | Jan. 10, 1950 |
| 2,544,255 | Chireix | Mar. 6, 1951 |